(12) United States Patent
Weinmann et al.

(10) Patent No.: US 12,345,194 B2
(45) Date of Patent: Jul. 1, 2025

(54) MIXING ARRANGEMENT FOR AN EXHAUST-GAS SYSTEM OF AN INTERNAL COMBUSTION ENGINE

(71) Applicant: Purem GmbH, Neunkirchen (DE)

(72) Inventors: Philipp Weinmann, Esslingen (DE); Heike Többen, Uhingen (DE); Mathias Rothfuss, Waiblingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/455,394

(22) Filed: Aug. 24, 2023

(65) Prior Publication Data

US 2024/0068390 A1 Feb. 29, 2024

(30) Foreign Application Priority Data

Aug. 25, 2022 (DE) ...................... 10 2022 121 456.7

(51) Int. Cl.
*F01N 3/28* (2006.01)
*F01N 3/20* (2006.01)
*F01N 13/14* (2010.01)

(52) U.S. Cl.
CPC ........... *F01N 3/2892* (2013.01); *F01N 3/206* (2013.01); *F01N 3/2066* (2013.01); *F01N 13/141* (2013.01); *F01N 2240/20* (2013.01); *F01N 2470/24* (2013.01); *F01N 2610/02* (2013.01)

(58) Field of Classification Search
CPC ...... F01N 3/206; F01N 3/2066; F01N 3/2892; F01N 13/141; F01N 2240/20; F01N 2470/24; F01N 2610/02
See application file for complete search history.

(56) References Cited

U.S. PATENT DOCUMENTS

| 2006/0275192 A1* | 12/2006 | Gabrielsson | F01N 3/2066 422/600 |
| 2008/0092526 A1* | 4/2008 | Kunkel | F01N 3/2066 60/303 |
| 2008/0092531 A1 | 4/2008 | Suzuki et al. | |
| 2010/0139258 A1* | 6/2010 | Hackett | B01F 25/431 60/299 |

(Continued)

FOREIGN PATENT DOCUMENTS

| DE | 10 2007 000 526 A1 | 4/2008 | |
| DE | 102009036511 A1 * | 2/2011 | .......... B01F 23/2132 |

(Continued)

*Primary Examiner* — Audrey B. Walter
(74) *Attorney, Agent, or Firm* — Walter Ottesen, P.A.

(57) ABSTRACT

A mixing arrangement for an exhaust-gas system of an internal combustion engine for mixing exhaust gas and reactant includes an exhaust-gas guiding component which delimits an exhaust-gas flow volume and which extends in the direction of a longitudinal axis, a reactant dispensing unit for dispensing reactant into the exhaust-gas flow volume, downstream of the reactant dispensing unit an exhaust-gas flow volume dividing arrangement, the exhaust-gas flow volume dividing arrangement dividing the exhaust-gas flow volume in a dividing length region into a plurality of partial exhaust-gas flow volumes, the plurality of partial exhaust-gas flow volumes including a central partial exhaust-gas flow volume and at least one partial exhaust-gas flow volume which surrounds the central partial exhaust-gas flow volume in a ring-like manner.

12 Claims, 2 Drawing Sheets

(56) References Cited

U.S. PATENT DOCUMENTS

2019/0112962 A1 4/2019 Gaiser

FOREIGN PATENT DOCUMENTS

| DE | 10 2017 124 276 A1 | 4/2019 | |
|----|----|----|----|
| DE | 10 2019 205 907 A1 | 11/2019 | |
| EP | 1712756 A1 * | 10/2006 | ......... B01F 3/04021 |
| EP | 2 314 837 A1 | 4/2011 | |
| EP | 3 473 827 A1 | 4/2019 | |
| WO | 2012/052690 A1 | 4/2012 | |
| WO | WO-2016195574 A1 * | 12/2016 | ......... B01F 23/2132 |

* cited by examiner

MIXING ARRANGEMENT FOR AN EXHAUST-GAS SYSTEM OF AN INTERNAL COMBUSTION ENGINE

CROSS-REFERENCE TO RELATED APPLICATIONS

This application claims priority of German patent application no. 10 2022 121 456.7, filed Aug. 25, 2022, the entire content of which is incorporated herein by reference.

TECHNICAL FIELD

The present disclosure relates to a mixing arrangement for an exhaust-gas system of an internal combustion engine for mixing exhaust gas and reactant.

BACKGROUND

US 2008/0092531 discloses an exhaust-gas system of an internal combustion engine, in which a mixing arrangement for mixing a urea solution, used as reactant, with exhaust gas is arranged between a particle filter and an exhaust-gas treatment unit in the form of an SCR catalytic converter. The mixing arrangement includes an exhaust-gas pipe which delimits an exhaust-gas flow volume, and a reactant dispensing unit for dispensing the urea solution into the exhaust gas flowing in the exhaust-gas pipe.

SUMMARY

It is an object of the present disclosure to provide a mixing arrangement for an exhaust-gas system of an internal combustion engine, the mixing arrangement being used to achieve improved mixing of exhaust gas and reactant.

This object is achieved according to the disclosure via a mixing arrangement for an exhaust-gas system of an internal combustion engine for mixing exhaust gas and reactant, including:
- an exhaust-gas guiding component which delimits an exhaust-gas flow volume and which extends in the direction of a longitudinal axis,
- a reactant dispensing unit for dispensing reactant into the exhaust-gas flow volume,
- downstream of the reactant dispensing unit an exhaust-gas flow volume dividing arrangement, the exhaust-gas flow volume dividing arrangement dividing the exhaust-gas flow volume in a dividing length region into a plurality of partial exhaust-gas flow volumes, the plurality of partial exhaust-gas flow volumes including a central partial exhaust-gas flow volume and at least one partial exhaust-gas flow volume which surrounds the central partial exhaust-gas flow volume in a ring-like manner.

The dividing of the exhaust-gas flow volume into the plurality of partial exhaust-gas flow volumes which are nested one inside the other or surround one another via the exhaust-gas flow volume dividing arrangement has the effect that, owing to the fact that each partial exhaust-gas flow volume is delimited by corresponding surface regions of the exhaust-gas flow volume dividing arrangement, in the dividing length region a relatively large total surface is provided on which the reactant, which is generally dispensed in droplet form into the exhaust-gas flow, can be deposited and be heated and is evaporated as a result. Since the thermal interaction with the reactant for heating of same is thus distributed over a large total surface, the exhaust-gas flow volume dividing arrangement providing this total surface is cooled only relatively little during the thermal interaction with the reactant and the resultant evaporation, which has the effect that efficient reactant evaporation can already be achieved at lower temperatures and thus the risk of reactant deposits forming in the region of the exhaust-gas flow volume can also be reduced. Improved evaporation and thus mixing of reactant with exhaust gas also has the effect that efficient conversion can already be effected at lower temperatures in an exhaust-gas treatment unit in particular for reducing the proportion of nitrogen oxide in the exhaust gas and the nitrogen oxide emissions can be lowered considerably as a result.

For a configuration which is simple to implement and assists efficient evaporation of the reactant, it is proposed for the exhaust-gas guiding component to be of tubular form at least in the dividing length region or/and to extend substantially rectilinearly in the direction of the longitudinal axis or/and to have a substantially circular cross-sectional geometry at least in the dividing length region.

The exhaust-gas flow volume dividing arrangement may include at least one tubular dividing body which is arranged in the exhaust-gas guiding component.

In this case, for a construction which is simple to implement and in line with a preferred shaping of the exhaust-gas guiding component, at least one, preferably each dividing body may also extend substantially rectilinearly in the direction of the longitudinal axis.

In order to provide the largest possible surface area for the thermal interaction with the reactant, the exhaust-gas flow volume dividing arrangement may include a plurality of dividing bodies which are arranged nested one inside the other.

A thermal interaction between the reactant and the exhaust-gas flow volume dividing arrangement or the exhaust-gas guiding component which is uniform over the flow cross section can be achieved by virtue of at least two, preferably all of the dividing bodies being arranged substantially concentrically with respect to one another.

The most uniform thermal interaction possible can preferably also be assisted by virtue of at least two, preferably all of the dividing bodies being formed with substantially the same cross-sectional geometry.

If at least one, preferably all of the dividing bodies are formed with a circular cross-sectional geometry, the partial exhaust-gas flow volumes which are nested one inside the other or which surround the central partial exhaust-gas flow volume have a substantially circular-ring-like cross-sectional geometry, which, particularly if these have the same radial extent over the entire circumference, enables a very uniform thermal interaction between the reactant and the exhaust-gas flow volume dividing arrangement over the entire circumference.

In order to be able to utilize the increase in surface area provided by the exhaust-gas flow volume dividing arrangement as efficiently as possible in the dividing length region, it is proposed that, in a downstream end region of the exhaust-gas flow volume dividing arrangement, all of the dividing bodies end substantially in the same axial region.

In a configuration which is advantageous with regard to the flow guidance or the flow resistance when exhaust gas and/or reactant enters the dividing length region, in an upstream end region of the exhaust-gas flow volume dividing arrangement, at least two, preferably all of the dividing bodies may end in different axial regions.

To this end, provision may be made for at least one, preferably each dividing body which is positioned radially further to the outside with respect to another dividing body to have a greater extent length in the upstream direction than the other dividing body.

In order for the mixing of exhaust gas and reactant to be further assisted and in particular also for the reactant dispensed into the exhaust-gas flow volume by the reactant dispensing unit to be distributed over the total flow cross section in as uniform as possible a manner, it is proposed that at least one exhaust gas/reactant mixing unit is arranged downstream of the reactant dispensing unit and upstream of the exhaust-gas flow volume dividing arrangement. Such an exhaust gas/reactant mixing unit may include, for example, a plurality of blade-like flow deflecting elements which follow one after the other in the circumferential direction and which generate a swirling flow, and thus swirling which assists the mixing, in the mixture of exhaust gas and reactant flowing through the exhaust gas/reactant mixing unit.

The disclosure also relates to an exhaust-gas system for an internal combustion engine, including a mixing arrangement constructed according to the disclosure and, downstream of the mixing arrangement, at least one exhaust-gas treatment unit, preferably an SCR catalytic converter.

BRIEF DESCRIPTION OF DRAWINGS

The invention will now be described with reference to the drawings wherein.

DETAILED DESCRIPTION

Figure 1:
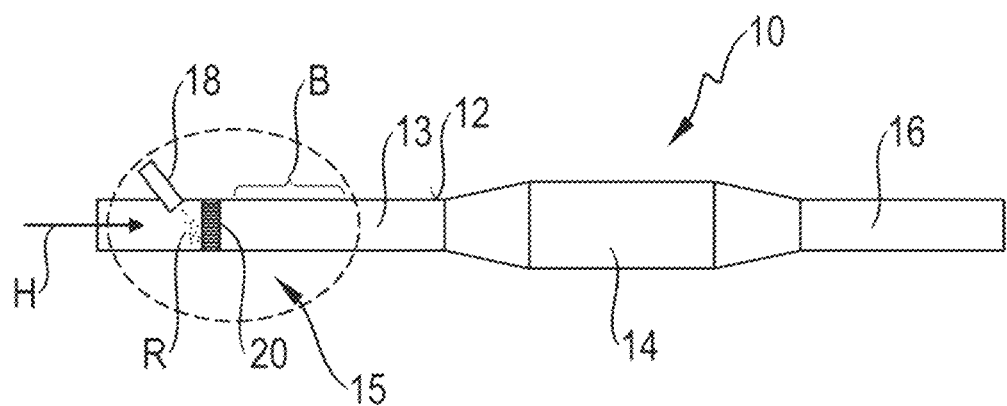
FIG. 1 shows a schematic illustration of an exhaust-gas system for an internal combustion engine in a vehicle.

In FIG. 1, an exhaust-gas system for an internal combustion engine for example in a vehicle is denoted generally by 10. The exhaust-gas system 10 includes, in an upstream region, a for example tubular exhaust-gas guiding component 12. This is adjoined by an exhaust-gas treatment unit 14, for example an SCR catalytic converter or the like. The exhaust-gas treatment unit 14 is followed by a further for example tubular exhaust-gas guiding component 16 via which the exhaust gas can be transferred for example to a muffler.

Figure 2:
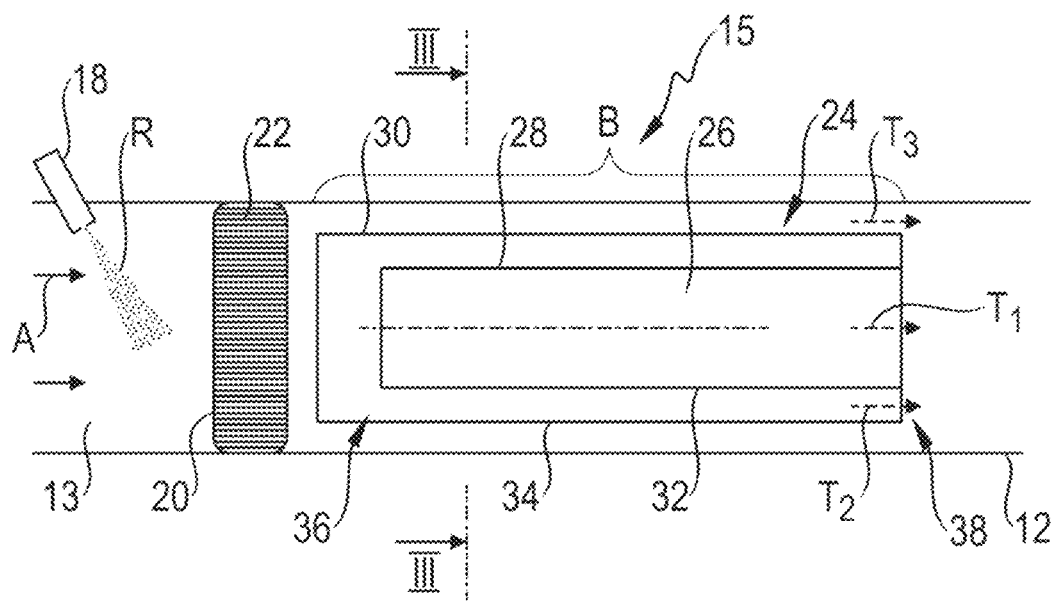
FIG. 2 shows portion II in FIG. 1 in detail.

The exhaust gas A emitted by an internal combustion engine flows in an exhaust-gas main flow direction H, which corresponds to an extent direction, visible in FIG. 2, of a longitudinal axis L of the tubular exhaust-gas guiding component 12, in the direction of the exhaust-gas treatment unit 14. Via a reactant dispensing unit 18 which is referred to generally as injector, a reactant R, for example a urea/water solution, is injected into the exhaust gas A flowing substantially in the exhaust-gas main flow direction H.

Arranged downstream of the reactant dispensing unit 18 is an exhaust gas/reactant mixing unit which is denoted generally by 20. This mixing unit may include a plurality of blade-like flow deflecting elements 22 which are schematically illustrated in FIG. 2 and which impart a swirling flow to the exhaust gas A flowing fundamentally in the exhaust-gas main flow direction H and, as a result, ensure enhanced swirling of exhaust gas and reactant R injected therein.

Provided downstream of the exhaust gas/reactant mixing unit 20 is an exhaust-gas flow volume dividing arrangement which is denoted generally by 24. This dividing arrangement divides, in a dividing length region B, an exhaust-gas flow volume 13 provided in the exhaust-gas guiding component 12 into a plurality of partial exhaust-gas flow volumes 26, 28, 30 which are open in the upstream direction and in the downstream direction such that they can be flowed through. To this end, in the configuration illustrated, the exhaust-gas flow volume dividing arrangement 24 includes two tubular dividing bodies 32, 34 which, just like the tubular exhaust-gas guiding component 12, are substantially rectilinearly elongated in the direction of the longitudinal axis L at least in the dividing length region B.

Figure 3:
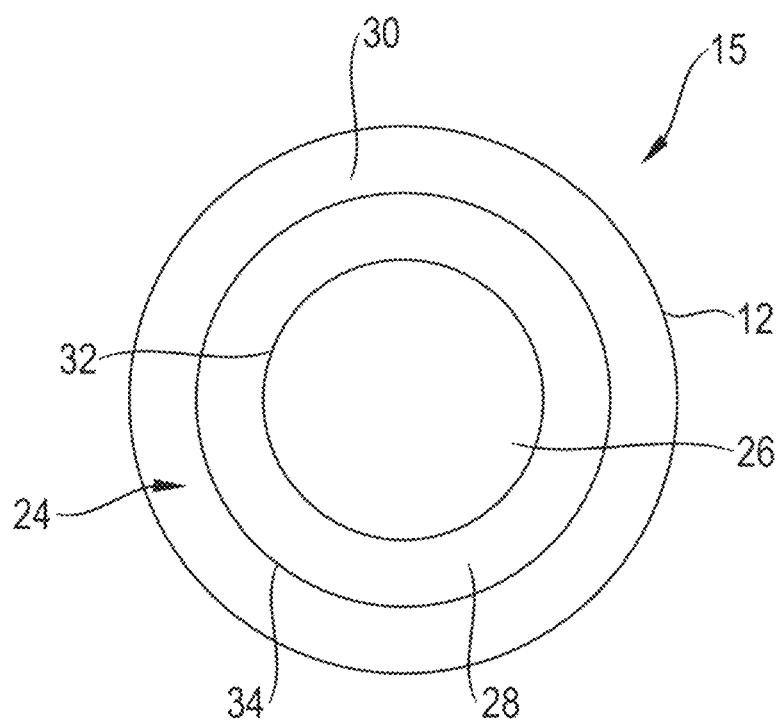
FIG. 3 shows a cross section through the portion of an exhaust-gas system shown in FIG. 2, in section along a line III-Ill in FIG. 2.

The tubular dividing bodies 32, 34 may, just like the exhaust-gas guiding component 12, have a substantially circular cross-sectional geometry at least in the dividing length region B, and, as can also be seen in FIG. 3, may be arranged concentrically with respect to one another and with respect to the longitudinal axis L. This has the result that the central partial exhaust-gas flow volume 26 delimited radially to the outside by the radially innermost dividing body 32 is surrounded by the two ring-like partial exhaust-gas flow volumes 28, 30 which are concentric with one another. On account of the dividing bodies 32, 34 and the exhaust-gas guiding component 12 being positioned concentrically with respect to one another and on account of the configuration thereof with a circular cross-sectional geometry, the central partial exhaust-gas flow volume 26 has a circular or circular-disk-like cross-sectional geometry, and the partial exhaust-gas flow volumes 28, 30 surrounding the central partial exhaust-gas flow volume in a ring-like manner have a radial dimension which is substantially constant over the entire circumference thereof.

It can be seen in FIG. 2 that, in an upstream end region 36 of the exhaust-gas flow volume dividing arrangement 24, the dividing bodies 32, 34 of the exhaust-gas flow volume dividing arrangement 24 end in different axial regions or extend to differing extents in the upstream direction. The radially innermost dividing body 32 or the dividing body 32 which is situated radially further to the inside is shorter or extends to a lesser extent in the upstream direction than the outermost dividing body 34 or the dividing body 34 which is situated radially further to the outside. This extent length of the dividing bodies in the upstream direction, the extent length increasing from radially inside to radially outside, assists a substantially uniform flow of exhaust gas A, transporting reactant R, into the partial exhaust-gas flow volumes 26, 28, 30.

In a downstream end region 38 of the exhaust-gas flow volume dividing arrangement 24, all of the dividing bodies 32, 34 preferably end in the same axial regions, such that the partial flows $T_1$, $T_2$, $T_3$ of the mixture of exhaust gas A and reactant R which flow through the respective partial exhaust-gas flow volumes 26, 28, 30 flow out in a substantially uniform manner and a unified flow of exhaust gas A and reactant R can flow onward in the direction of the exhaust-gas treatment unit 14.

In the case of the mixing arrangement 15 constructed according to the disclosure including substantially the exhaust-gas guiding component 12, the reactant dispensing unit 18, the exhaust gas/reactant mixing unit 20 and the exhaust-gas flow volume dividing arrangement 24, the exhaust-gas flow volume dividing arrangement 24 or the dividing bodies 32, 34 thereof in conjunction with the exhaust-gas guiding component 12 surrounding the latter in the dividing length region B provides a large total surface which, during operation of an internal combustion engine, is flowed around by the exhaust gas A and thus absorbs heat therefrom. The total surface provided in the dividing length region B by the exhaust-gas guiding component 12 and the dividing bodies 32, 34 can thus be utilized to heat and evaporate the reactant R which is transported in the exhaust gas A and which is still present in droplet form, that is, in liquid form, in significant parts, in order to, as a result, achieve efficient mixing of exhaust gas A and reactant R upstream of the exhaust-gas treatment unit 14 in the form for example of an SCR catalytic converter. Since each surface unit of the thus provided total surface can be impinged on by a relatively small amount of the reactant R to be evaporated and can thus extract heat therefrom, the thermal interaction between the dividing bodies 32, 34 or the exhaust-gas guiding component 12 and the reactant R results in only relatively little heat being extracted from these components, such that efficient reactant evaporation is already ensured even at relatively low temperatures. This in turn reduces the risk of non-evaporated reactant R, that is, reactant which is initially still present in liquid form, being deposited in regions of the exhaust-gas system 10 and forming deposits there.

Furthermore, the efficient evaporation and, as a result, also mixing of reactant with exhaust gas has the result that an efficient reduction in the proportion of pollutants, in particular in the proportion of nitrogen oxide, in the exhaust gas A can be achieved in the downstream exhaust-gas treatment unit 14. Since, furthermore, there is a substantially symmetrical configuration over the entire circumference of the exhaust-gas system 10 in the dividing length region B, it is also the case that exhaust gas A and reactant R are mixed, and reactant R is evaporated, in a very uniform manner over the entire flow cross section, which in turn has the result that the total available cross section can be utilized uniformly for carrying out the generally catalytic exhaust-gas purification reaction in the downstream exhaust-gas treatment unit 14.

It should be pointed out that it is of course possible for a wide variety of variations to be implemented in the case of the mixing arrangement 15 constructed according to the disclosure. It is for example possible for more than the two illustrated dividing bodies 32, 34 to be arranged nested one inside the other, it preferably then still being the case that, in the upstream end region 36, the extent length of the radially staggered dividing bodies increases from radially inside to radially outside in the upstream direction. It is furthermore possible, if this is advantageous for flow reasons, for the cross-sectional geometry of the dividing bodies 32, 34 and possibly also of the exhaust-gas guiding component 12 to deviate, in particular in the dividing length region B, from the above-described substantially circular cross-sectional geometry illustrated in the figures and to for example be of flattened round, for example elliptical, form. In this case, it is for example also possible to achieve a configuration in which, given a concentric arrangement of the dividing bodies with respect to one another and also with respect to the exhaust-gas guiding component, the ring-like partial flow volumes have an approximately constant radial dimension over the entire circumference.

It is understood that the foregoing description is that of the preferred embodiments of the invention and that various changes and modifications may be made thereto without departing from the spirit and scope of the invention as defined in the appended claims.

The invention claimed is:

1. A mixing arrangement for an exhaust-gas system of an internal combustion engine for mixing exhaust gas and reactant, the mixing arrangement comprising:

an exhaust-gas guide delimiting an exhaust-gas flow volume and extending in a direction of a longitudinal axis;

a reactant dispenser configured to dispense reactant into said exhaust-gas flow volume;

an exhaust-gas flow volume divider arranged downstream of said reactant dispenser;

said exhaust-gas flow volume divider being configured to divide the exhaust-gas flow volume in a dividing length region into a plurality of partial exhaust-gas flow volumes and including a plurality of dividing bodies nested one inside the other for providing a radially staggered arrangement of said exhaust-gas guide and said plurality of dividing bodies in said dividing length region;

said plurality of partial exhaust-gas flow volumes including a central partial exhaust-gas flow volume and a plurality of partial exhaust-gas flow volumes surrounding said central partial exhaust-gas flow volume in an annular manner; and a total surface provided in the dividing length region by said exhaust-gas guide and said plurality of dividing bodies providing an evaporation surface for evaporating reactant dispensed by said reactant dispenser upstream of said exhaust-gas flow volume divider.

2. The mixing arrangement of claim 1, wherein at least one of the following applies to said exhaust-gas guide which:
   i) is of tubular form at least in said dividing length region;
   ii) extends rectilinearly in said direction of said longitudinal axis; and,
   iii) has a circular cross-sectional geometry at least in said dividing length region.

3. The mixing arrangement of claim 1, wherein said at least ene each dividing body extends rectilinearly in the direction of the longitudinal axis.

4. The mixing arrangement of claim 1, wherein at least two of said dividing bodies are arranged to be mutually concentric.

5. The mixing arrangement of claim 1, wherein at least two of said dividing bodies are formed with a same cross-sectional geometry.

6. The mixing arrangement of claim 1, wherein at least one of said dividing bodies is formed having a circular cross-sectional geometry.

7. The mixing arrangement of claim 1, wherein said exhaust-gas flow volume divider defines a downstream end region; and, all of said dividing bodies end in said downstream end region.

8. The mixing arrangement of claim 1, wherein said exhaust-gas flow volume divider defines an upstream end region; and, at least two dividing bodies of said plurality of dividing bodies end in different axial locations in said upstream end region.

9. The mixing arrangement of claim 8, wherein at least one of said plurality of dividing bodies is positioned radially farther to the outside with respect to an other dividing body of said plurality of dividing bodies; and, said at least one dividing body has a greater extent length in the upstream direction than said other dividing body.

10. The mixing arrangement of claim 1, further comprising at least one exhaust gas/reactant mixer arranged downstream of said reactant dispenser and upstream of said exhaust-gas flow volume divider.

11. An exhaust-gas system for an internal combustion engine, the exhaust-gas system comprising:

a mixing arrangement including: an exhaust-gas guide delimiting an exhaust-gas flow volume and extending in a direction of a longitudinal axis; a reactant dispenser configured to dispense reactant into said exhaust-gas flow volume; an exhaust-gas flow volume divider arranged downstream of said reactant dispenser; said exhaust-gas flow volume divider being configured to divide the exhaust-gas flow volume in a dividing length region into a plurality of partial exhaust-gas flow volumes and including a plurality of dividing bodies nested one inside the other for providing a radially staggered arrangement of said exhaust-gas guide and said plurality of dividing bodies in said dividing length region; said plurality of partial exhaust-gas flow volumes including a central partial exhaust-gas flow volume and a plurality of partial exhaust-gas flow volumes surrounding said central partial exhaust-gas flow volume in an annular manner, a total surface provided in the dividing length region by said exhaust-gas guide and said plurality of dividing bodies providing an evaporation surface for evaporating reactant dispensed by said reactant dispenser upstream of said exhaust-gas flow volume divider; and, at least one exhaust-gas treatment unit being arranged downstream of said mixing arrangement.

12. The exhaust-gas system of claim 11, wherein said exhaust-gas treatment unit is an SCR catalytic converter.

\* \* \* \* \*